United States Patent [19]
Shields

[11] Patent Number: 4,998,095
[45] Date of Patent: Mar. 5, 1991

[54] EMERGENCY TRANSMITTER SYSTEM

[75] Inventor: Neal G. Shields, Forth Worth, Tex.

[73] Assignee: Specific Cruise Systems, Inc., Ft. Worth, Tex.

[21] Appl. No.: 423,976

[22] Filed: Oct. 19, 1989

[51] Int. Cl.[5] .......... G08B 13/00; H04B 1/40
[52] U.S. Cl. .......... 340/574; 340/538; 340/825.49; 455/88
[58] Field of Search .......... 340/574, 539, 825.45, 340/825.49, 825.72, 538, 693, 310 A; 455/39, 49, 53, 73, 88, 90, 100

[56] References Cited

U.S. PATENT DOCUMENTS

| | | | |
|---|---|---|---|
| 3,739,329 | 6/1973 | Lester | 340/825.49 X |
| 4,083,003 | 4/1978 | Haemmig | 455/100 X |
| 4,157,540 | 6/1979 | Oros | 340/539 |
| 4,189,721 | 2/1980 | Doell | 340/539 |
| 4,357,602 | 11/1982 | Lemelson | 340/539 |
| 4,404,549 | 9/1983 | Berg | 340/574 |
| 4,591,823 | 5/1986 | Horvat | 340/466 X |
| 4,602,357 | 7/1986 | Yang et al. | 340/574 X |
| 4,611,198 | 9/1986 | Levinson et al. | 340/539 |
| 4,630,035 | 12/1986 | Stahl et al. | 340/539 |
| 4,706,689 | 11/1987 | Man | 340/539 X |
| 4,764,757 | 8/1988 | DeMarco et al. | 340/574 |
| 4,924,211 | 5/1990 | Davies | 455/88 X |

FOREIGN PATENT DOCUMENTS

| | | | |
|---|---|---|---|
| 2707869 | 8/1978 | Fed. Rep. of Germany | 340/574 |
| 2377674 | 9/1978 | France | 340/574 |

*Primary Examiner*—Glen R. Swann, III
*Assistant Examiner*—Thomas J. Mullen, Jr.
*Attorney, Agent, or Firm*—James E. Bradley

[57] ABSTRACT

An emergency transmitter system is disclosed for enhancing the personal security of individuals within a predetermined geographic area such as a campus, shopping mall or stadium. A plurality of fixed transceivers are located at selected locations within the predetermined geographic area, preferably in a substantially equidistant pattern throughout the area. In a preferred embodiment of the present invention, each fixed transceiver is preferably located in conjunction with a street light in an elevated location. A battery powered low power portable transmitter is then issued to selected individuals, each transmitter including circuitry for transmitting a coded signal associated with a particular individual. In the event of an emergency situation, the portable transmitter is activated, utilizing an irrevocable manual activation switch, and the coded signal is transmitted utilizing the low power radio frequency signal. Reception of the coded signal at one or more fixed transceivers will cause those transceivers to retransmit that coded signal along with a second coded signal indicative of the locations of the fixed transceivers. Reception of this signal at a central receiver will result in a display indicating the particular individual and the geographic location as determined by the locations of the fixed transceivers, thus allowing security personnel to rapidly respond to an emergency situation while discouraging prank alarms.

6 Claims, 2 Drawing Sheets

EMERGENCY TRANSMITTER SYSTEM

BACKGROUND OF THE INvENTION

1. Field of the Invention

This invention relates in general to the field of security devices and in particular to the field of portable security devices which may be utilized over a wide geographic area. Still more particularly, the present invention relates to portable security devices which may be utilized in conjunction with an emergency transmitter to indicate the location of an emergency situation within a wide geographic area.

2. Description of the Prior Art

Personal security devices are well known in the prior art. Such devices include chemical devices, such as Mace sprays, or acoustic devices, such as sirens or horns. More recently, the field of security devices has expanded to include small hand-held portable transmitters which utilize infrared or radio frequency transmissions to arm or release a security device or lock system.

One example of such a security system is disclosed in U.S. Pat. No. 4,740,775, issued Reese Price on Apr. 26, 1988. This patent discloses an automobile burglar alarm and theft prevention device which includes an alarm circuit including a battery and alarm and vibration detectors which are adapted to close the alarm circuit upon sensing vibrations caused by automobile tampering. The alarm system is armed by the reception of signals generated by a pulse generator which is part of a radio receiving unit within the alarm system which responds to high frequency waves from a push button transmitter.

An additional utilization of a portable transmitter in an alarm system is disclosed in U.S. Pat. No. 4,523,178, issued to George E. Fulhorst on June 11, 1985. In this patent the security system disclosed utilizes a portable transmitter in conjunction with a receiver located within the system operator's vehicle. In the event of an emergency condition, the activation of the portable transmitter and subsequent transmission of a coded signal to the receiver will result in various automobile devices operating, such as horns or lights, to indicate an alarm condition.

Similarly, a system has been recently advertised which includes a small low power portable transmitter which is designed to be carried by the aged or infirm while located within a home or apartment. A receiver tuned to the signals transmitted by the transmitter is coupled to the telephone system and is programmed to dial a predetermined telephone number in response to activation of the transmitter. Thus, an elderly or infirm individual who has an emergency condition which prevents that person from reaching the telephone can, by activation of the portable transmitter, cause an emergency telephone call to be placed to a predetermined telephone number, so that assistance can be rendered by the persons at that location.

However, none of the aforementioned systems disclose a method whereby an individual located within a large geographic area, such as a campus, shopping mall, or athletic stadium, can immediately and accurately summon emergency assistance to a readily determined geographic area. Thus, it should be apparent that a need exists for a system whereby individuals within such a geographic location can simply and easily summon emergency assistance to a precise geographic location within the specified area.

SUMMARY OF THE INvENTION

It is therefore one object of the present invention to provide an improved portable security device.

It is another object of the present invention to provide an improved portable security device which may be utilized over a wide geographic area.

It is yet another object of the present invention to provide an improved portable security device which may be utilized to summon emergency assistance to a specific location within a wide geographic area.

The foregoing objects are achieved as is now described. The emergency transmitter system of the present invention utilizes a plurality of fixed transceivers which are located at selected locations within a predetermined geographic area, preferably in a substantially equidistant pattern throughout the area. In a preferred embodiment of the present invention, each fixed transceiver is preferably located in conjunction with a street light in an elevated location. A battery powered low power portable transmitter is then issued to selected individuals, each transmitter including circuitry for transmitting a coded signal associated with a particular individual. In the event of an emergency situation, the portable transmitter is activated, utilizing an irrevocable manual activation switch, and the coded signal is then transmitted utilizing a low power radio frequency signal. Reception of the coded signal at one or more fixed transceivers will cause those transceivers to retransmit the coded signal along with a second coded signal indicative of the locations of the fixed transceivers. Reception of this signal at a central receiver will result in a display indicating the particular individual and the geographic location as determined by the locations of the fixed transceivers, thus allowing security personnel to rapidly respond to an emergency situation while discouraging prank alarms.

The above as well as additional objects, features, and advantages of the invention will become apparent in the following detailed description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
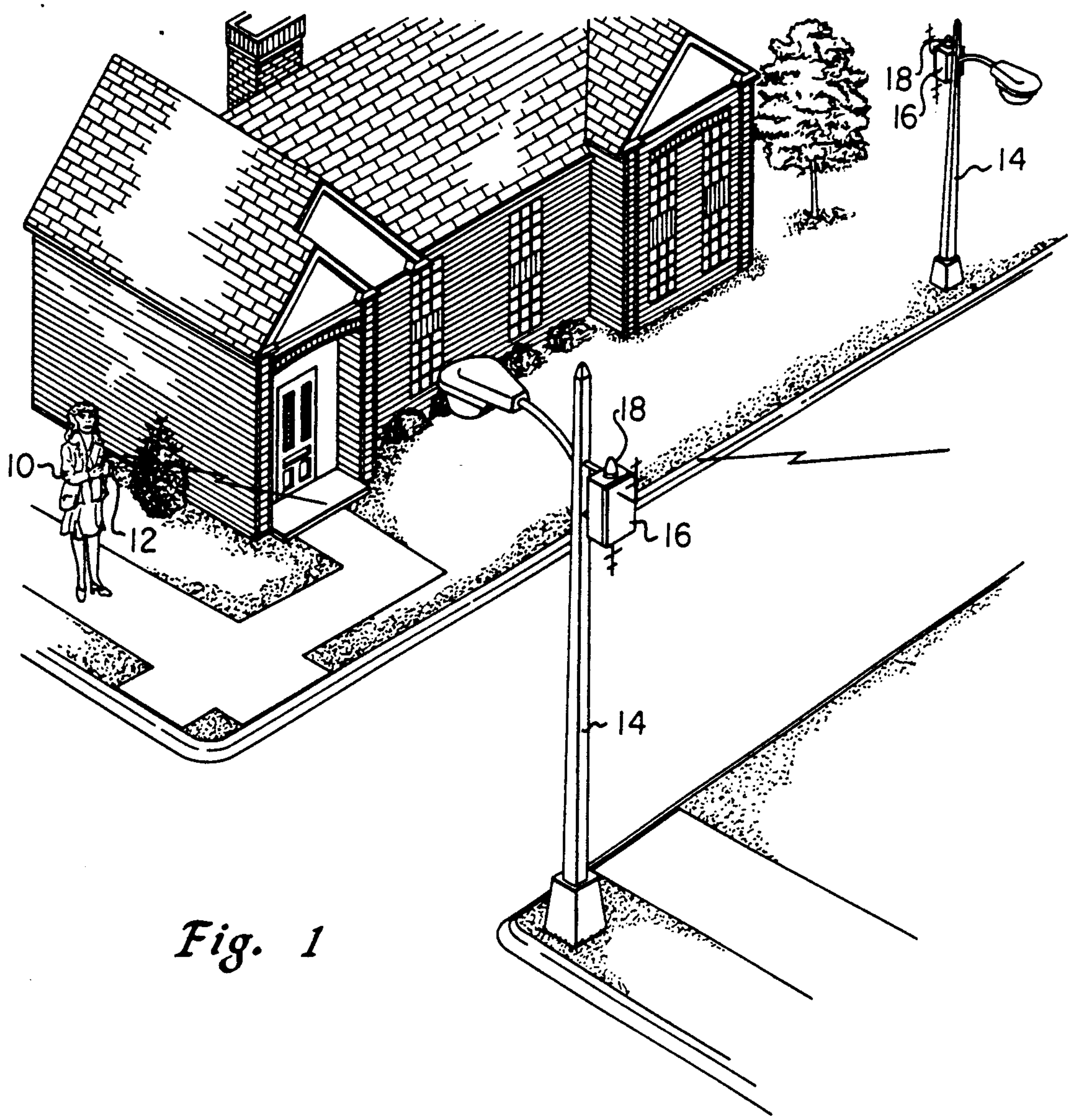
FIG. 1 is a pictorial representation of a geographic area equipped with the emergency transmitter system of the present invention.

With reference now to the figures and in particular with reference to FIG. 1, there is depicted a pictorial representation of a geographic area equipped with the emergency transmitter system of the present invention. As may be seen, an individual 10, located at any point within a given geographic area such as a campus, shopping mall, or athletic stadium, may easily carry a handheld low power portable transmitter 12 for utilization with the emergency transmitter system of the present invention. Located at various locations throughout the geographic area are a plurality of fixed transceivers 16.

As is illustrated in FIG. 1, each fixed transceiver 16 is preferably mounted on a light pole 14. In this manner, a plurality of fixed receivers 16 may be located throughout a predetermined geographic area, preferably in a substantially equidistant pattern throughout the area. Several additional advantages are achieved by mounting each fixed transceiver 16 in an elevated position on a light pole 14. Firstly, the utilization of low power transmitters for each portable transmitter 12 make the elevation of each fixed transceiver 16 an advantage in terms of the transmitting range of each portable transmitter unit 12. Additionally, each light pole 14 is generally coupled to an electrical power distribution network which provides power for each electric light mounted thereon. By mounting a fixed transceiver unit 16 on each light pole 14 it will be a simple matter to provide electrical power to each fixed transceiver 16 from the available electrical power distribution network.

As is also illustrated in FIG. 1, associated with each fixed transceiver 16 is a strobe light 18. In this manner, during an emergency situation a signal received at fixed transceiver 16 may be relayed to a central receiving unit in a manner which will be explained in greater detail herein and may also be utilized to activate strobe light 18. Thus, emergency personnel responding to such a condition may easily and accurately proceed to the immediate geographic area of the emergency situation, as indicated by strobe light 18. Of course, those skilled in the art will appreciate that in place of or in addition to strobe light 18 may be provided a siren or other audio alarm indicator means.

Figure 2:
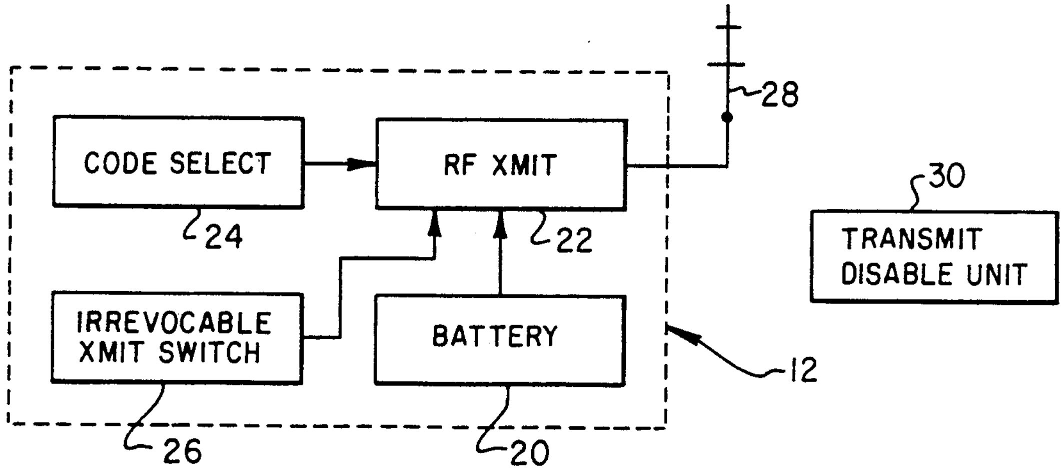
FIG. 2 block diagram of a portable transmitter which may be utilized with the emergency transmitter system of the present invention.

Referring now to FIG. 2, there is depicted a block diagram of a portable transmitter 12 which may be utilized with the emergency transmitter system of the present invention. As is illustrated, portable transmitter 12 preferably includes a battery 20 which is utilized to provide power to radio frequency transmitter 22. A code select chip 24 is utilized to produce a preselected binary code, in a manner well known in the prior art. Many such code select chips are available such as the Model ED-9 Encoder manufactured by Supertex, Incorporated of Sunnyvale, Calif. By utilizing such a code select chip those ordinarily skilled in the art will appreciate that it will be possible to cause portable transmitter 12 to continually transmit a binary code which is associated with a specific individual via antenna 28. Of course, antenna 28 may be an internally or externally mounted antenna. In this manner, the competent authorities may know instantly the identity of a person transmitting such an emergency signal utilizing the emergency transmitter system of the present invention. In one embodiment of the present invention, multiple transparent codes may be utilized to transmit a section of code indicative of the relative security of the situation.

In a preferred embodiment of the present invention, an irrevocable transmit switch 26 is utilized to energize radio frequency transmitter 22. That is, once depressed irrevocable transmit switch 26 will cause radio frequency transmitter 22 to continue transmitting until such time as the electrical power provided by battery 20 has been exhausted. In this manner, an attacker is not able to disable radio frequency transmitter 22 and prevent the emergency signal from being transmitted. Of course, those skilled in the art will appreciate that a transmit disable unit 30 may be provided to permit an individual to disable the transmission by radio frequency transmitter 22. This may be accomplished utilizing a simple mechanical tool which may be inserted within portable transmitter unit 12 to reset irrevocable transmit switch 26 or, in an alternative embodiment, may be provided utilizing an electronic transmitting device which electronically resets irrevocable transmit switch 26, in a manner well known in the electronic art. Alternatively, a monetary contact transmit switch may be utilized with the subsequent possibility of inadvertent false alarms.

Figure 3:
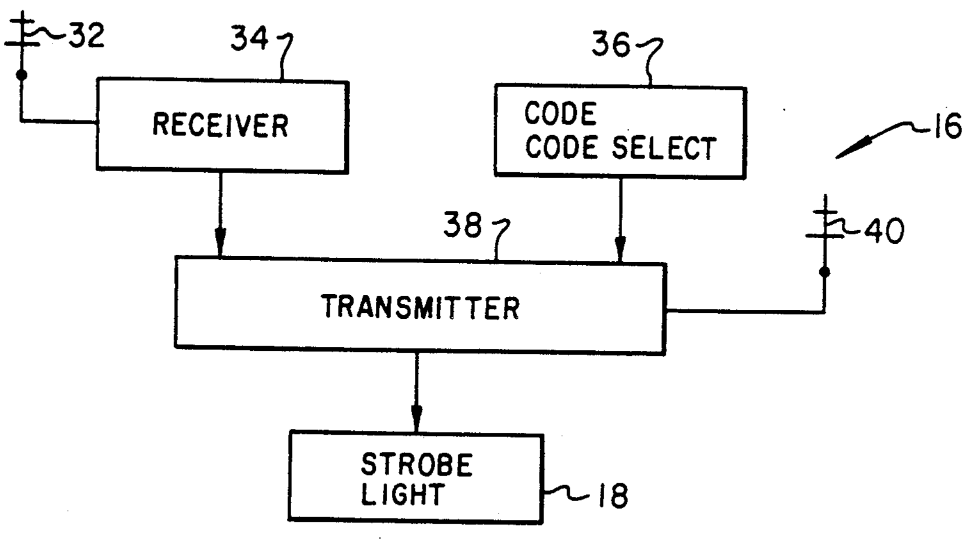
FIG. 3 is a block diagram of a fixed transceiver unit which may be utilized with the emergency transmitter system of the present invention.

With reference now to FIG. 3, there is depicted a block diagram of fixed transceiver unit 16 which may be utilized in conjunction with the emergency transmitter system of the present invention. Upon the receipt of an emergency transmission, including an appropriate binary code identifying the transmitter thereof, at antenna 32 by receiver 34, that information will then be coupled to fixed transmitter 38. Also coupled to fixed transmitter 38 is a location code select chip 36. In the manner similar to that described above with respect to portable transmitter 12, location code select chip 36 is utilized to provide a binary code which is associated with a particular geographic location within the geographic area being monitored by the emergency transmitter system of the present invention.

Thereafter, fixed transmitter 38 will transmit, via antenna 40, an emergency signal comprising two binary codes. A first binary code identifying the individual associated with portable transmitter 12 and a second binary code identifying the physical location of fixed transmitter 38. Of course, those skilled in the radio frequency transmission art will appreciate that this may be accomplished utilizing two separate binary code windows or by encoding identical codes in the upper and lower sideband of the transmission spectra of fixed transmitter 38. Additionally, in accordance with a preferred embodiment of the present invention, fixed transmitter 38 may also be effective to activate strobe light 18, in response to the reception of an emergency signal from a portable transmitter 12.

Figure 4:
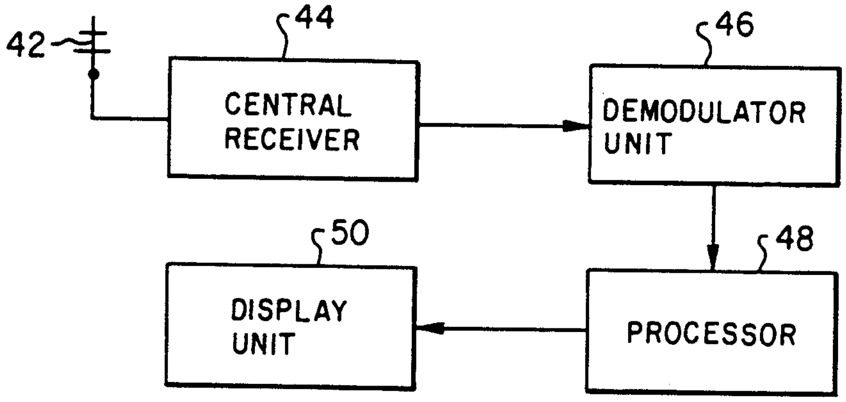
FIG. 4 is a block diagram of a central receiver system which may be utilized with the emergency transmitter system of the present invention.

Referring now to FIG. 4, there is depicted a block diagram of a central receiver system which may be utilized in conjunction with the emergency transmitter system of the present invention. As is illustrated, the central receiver system includes an antenna 42 which is coupled to a central receiver 44. Upon the receipt of an emergency signal from fixed transmitter 38 (see FIG. 3) the output of central receiver 44 is then coupled to demodulator unit 46, which is utilized to electronically remove the location code and individual code signals from the emergency signal thus received in a manner well known in the communications art.

Next, processor 48 is utilized to process the demodulated codes to determine the physical location of fixed transmitter 38 and the identity of the individual in possession of portable transmitter 12. This information is thereafter displayed to the competent emergency authorities via display unit 50. Those skilled in the art will appreciate that processor 48 and display unit $o may be implemented utilizing an appropriately programmed personal computer system.

Figure 5:
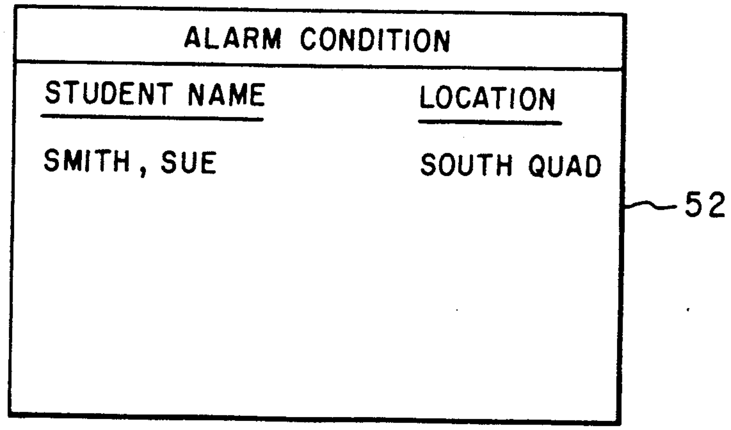
FIG. 5 is a pictorial representation of a display screen which may be utilized with the central receiver system of the emergency transmitter system of the present invention.

Finally, referring to FIG. 5, there is depicted a pictorial representation of a display screen which may be utilized with the central receiver system of the emergency transmitter system of the present invention. As is illustrated, display unit 50 (see FIG. 4) may be utilized to generate a display screen 52 upon the occurrence of an emergency transmission by a portable transmitter 12. Display screen 52 is preferably utilized to provide an alphanumeric display of the student's name associated with a particular portable transmitter 12, in a campus situation, along with the location of the fixed transmitter unit which is closest to the emergency situation. Of course, those skilled in the art will appreciate that a portable transmitter unit 12 located between two fixed transceiver units 16 may result in an emergency signal being retransmitted by both fixed transceivers 16; however, processor 48 may be simply and easily programmed in such conditions to indicate a physical location which is between these two fixed transceivers. In this manner, it is possible to even more accurately ascertain the location of an emergency condition so that appropriate personnel may respond.

Upon reference to the foregoing specification, those skilled in the art will appreciate that the Applicant has provided an emergency transmitter system which permits security personnel to rapidly and accurately respond to an emergency condition with prior knowledge of the individual who has initiated the emergency condition signal and a reasonably accurate knowledge of the specific location of the emergency. In an alternate embodiment it is possible to utilize the fixed transceiver units to periodically poll each transmitter unit or the fixed receiver unit to ensure that jamming does not occur.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. An emergency transmitter system for enhancing the personal security of individuals within a predetermined outdoor geographic area having fixed boundaries and a plurality of street light devices coupled to an electrical power distribution network provided for said street light devices, said plurality of street light devices disposed at selected locations within said predetermined outdoor geographic area, said emergency transmitter system comprising:

at least one battery powered portable transmitter for transmitting a coded signal associated with a particular individual;

a plurality of fixed transceivers each disposed in an elevated position in conjunction with a selected one of said street light devices and coupled to and powered by said electrical power distribution network at said selected one of said street light devices, each of said plurality of fixed transceivers including receiver circuitry for receiving said coded signal and transmitter circuitry for retransmitting said coded signal in conjunction with a second coded signal associated with a particular one of said selected locations; and central receiver means for receiving transmissions from said plurality of fixed transceivers and for displaying an identification of said particular individual and said particular one of said selected locations.

2. An emergency transmitter system according to claim 1, wherein said at least one battery powered portable transmitter includes an irrevocable manual activation switch.

3. An emergency transmitter system according to claim 1, further including deactivation means for stopping transmission by said at least one battery powered portable transmitter.

4. The emergency transmitter system according to claim 1 further including alarm means located at each of said plurality of fixed transceivers for indicating an alarm condition in response to the reception of said coded signal.

5. The emergency transmitter system according to claim 4 wherein said alarm means comprises a flashing light.

6. The emergency transmitter system according to claim 1 wherein said central receiver means includes an appropriately programmed computer having a display associated therewith for displaying an alphanumeric indication of said particular individual and said particular one of said selected locations.

* * * * *